Feb. 6, 1945. A. M. YOUNG 2,368,698
HELICOPTER AIRCRAFT
Filed March 10, 1943 6 Sheets-Sheet 4
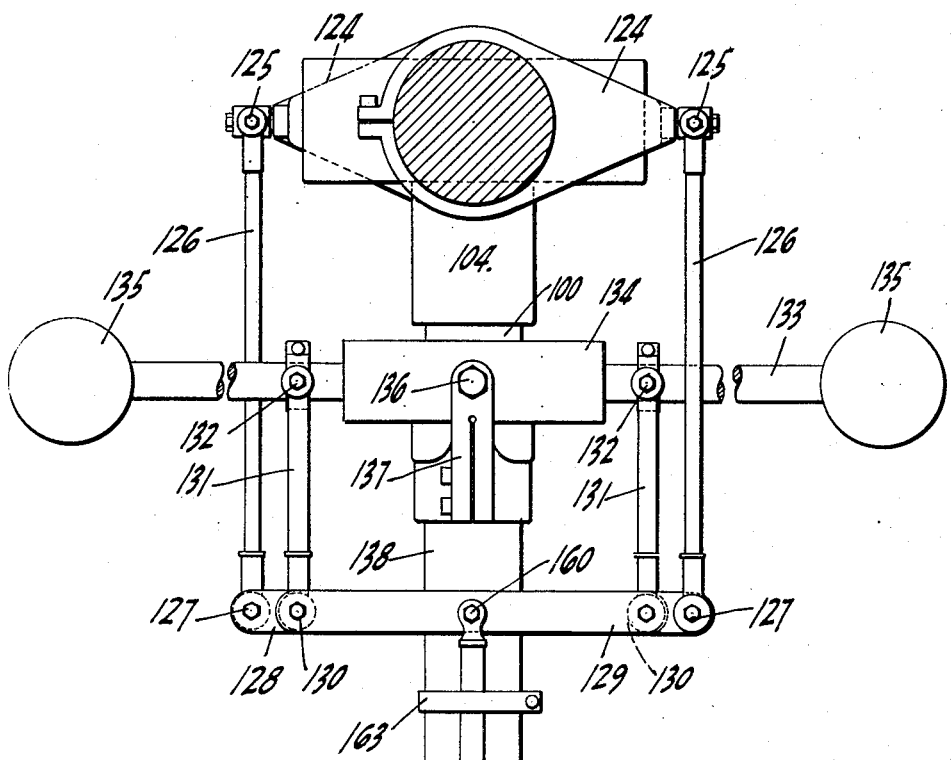
FIG. 8.
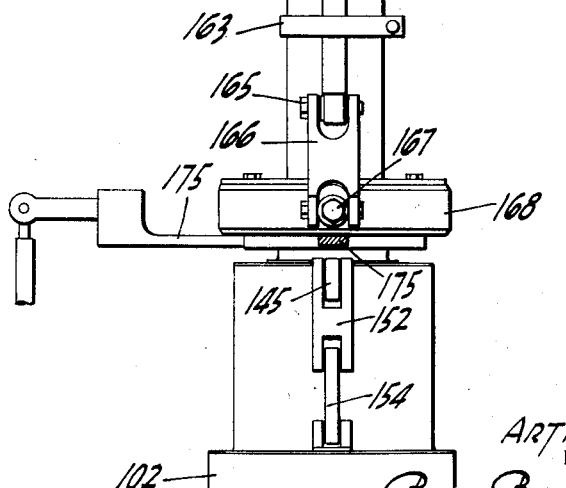
INVENTOR
ARTHUR M. YOUNG
BY
Bean, Brooks, Buckley & Bean.
ATTORNEYS

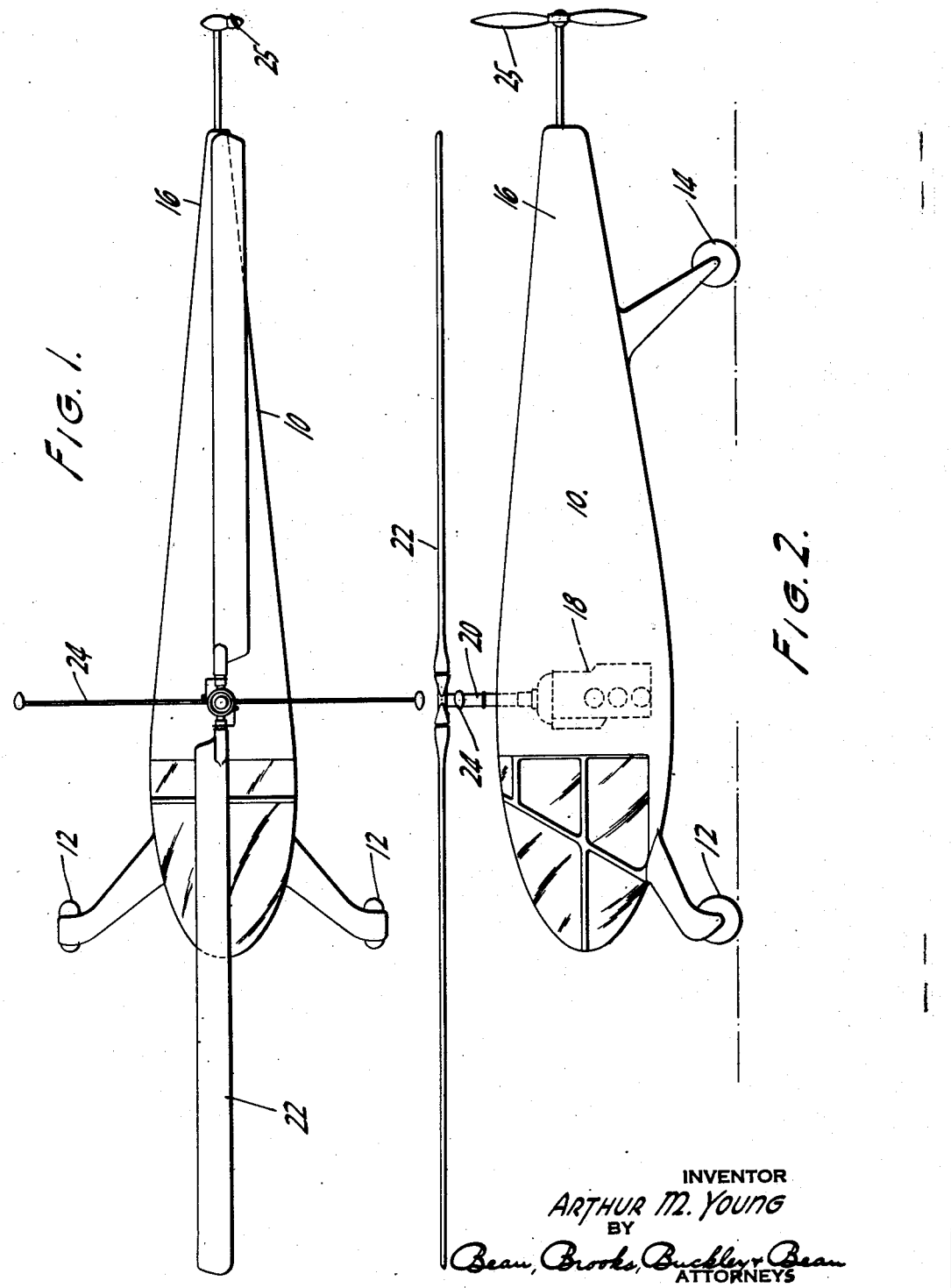

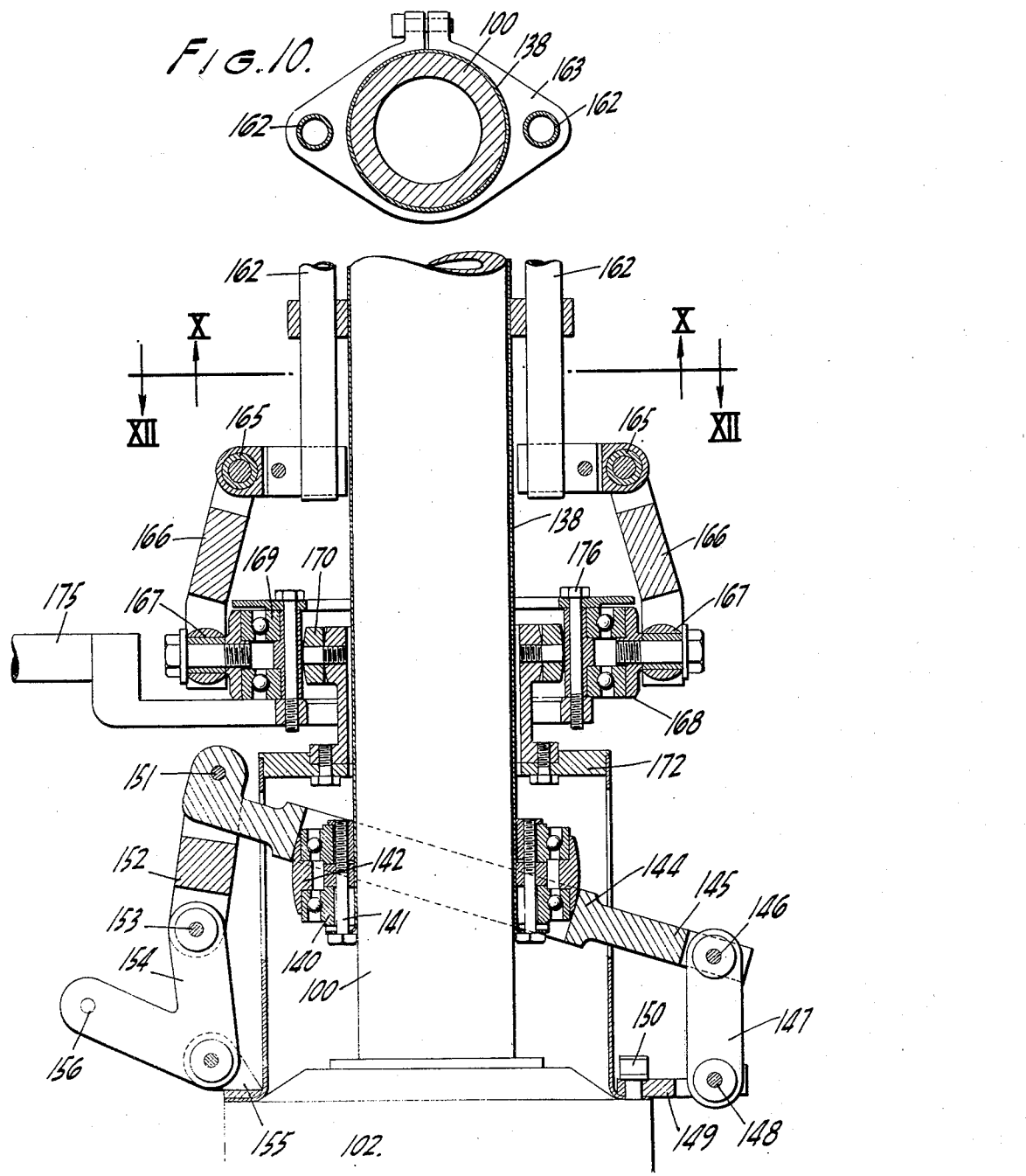

INVENTOR
ARTHUR M. YOUNG
BY
Bean, Brooks, Buckley & Bean
ATTORNEYS

Patented Feb. 6, 1945

2,368,698

UNITED STATES PATENT OFFICE 2,368,698

HELICOPTER AIRCRAFT

Arthur M. Young, Buffalo, N. Y., assignor to Bell Aircraft Corporation, Buffalo, N. Y.

Application March 10, 1943, Serial No. 478,687

23 Claims. (Cl. 244—17)

This invention relates to helicopter aircraft, and more particularly to improvements in flight control means therefor.

I have discovered that in helicopter aircraft the combination of a pendular mast and an inclinable rotating inertia means provides a self-correcting artificial horizon. In effect, the pendular mast is a vertical-seeking pendulum, and the rotating inertia means functions as an averaging agent, whereby the combinaiton operates to provide a horizon means that is not disturbed by accelerations (as would be the case with a pendulum alone), and that is not subject to wandering away from a true horizon (as would be the case with a neutrally suspended rotating flywheel alone). To take full advantage of such inherent stability features it is necessary to provide a control arrangement which will not interfere with the proper coordination of the pendular mast and inclinable inertia means. The mast normally assumes a vertical attitude, but may be temporarily deflected therefrom.

I have found that in order to obtain optimum inherent stability the rotor should comprise opposed blades extending radially from the rotor hub, and that the hub should be mounted upon the rotor supporting mast so that the rotor is free to turn about the longitudinal axis of the rotor blade unit, and that the adjustment of the rotor about such axis should be governed by means of the inertia device arranged to normally rotate in a plane perpendicular to the rotor mast. Also, for optimum aircraft performance the rotor blades should be individually adjustable to turn in opposite directions for blade pitch change effects, whereby the lift characteristics of the rotor may be adjusted at will in accord with flight performance requirements.

In the case of my prior helicopter control arrangements for use in conjunction with the type of rotor mounting referred to, the pilot control "stick" or lever through which the pilot applies forces to tilt the inertia means out of the normal plane of rotation thereof is necessarily free at all times to move relative to the aircraft fuselage. This was required in order to adapt the prior control systems to permit the inertia devices thereof to control the rotor systems. As distinguished from this, the present invention contemplates an improved control means for helicopter aircraft whereby the pilot control device is adapted to be manually locked by the operator at any desired position of adjustment, whereby the aircraft will then continue to move in the same direction and uniformly at the same speed, while remaining inherently stable at all times. This dispenses with the necessity for pilot attention to the control device during normal cruising and until the pilot desires to change the speed or the direction of flight.

Thus, the present invention contemplates a control means for use in conjunction with the helicopter arrangement above referred to by means of which control of the aircraft can be had without disrupting the relationship of the mast and the inertia means. That is, without causing the flywheel to be changed from the position it would occupy due to the influence of the pendular driving means alone, or from the average position of the pendular fuselage. To this end the present invention provides control means for varying the length of the interconnection between the flywheel and the lifting rotor in step with the rotation of the rotor, and places the control of such variation in the hands of the pilot. It is necessary, however, that the interconnecting member should be so arranged that its effective length be not greatly influenced by rocking movements of the mast. Otherwise the purpose of the flywheel will be defeated, and the machine rendered unstable.

The primary object of the present invention is therefore to provide a helicopter which is of improved stability and controllability. Another object is to provide pilot control means in an inertia-stabilized helicopter which shall require a minimum of attention by the pilot and prevent pilot interference with operation of the stabilizing effects. Other objects and advantages of the invention will appear in the specification hereinafter.

In the drawings:

Fig. 1 is a top plan of an airplane of the invention;

Fig. 2 is a side elevation thereof;

Fig. 8 is an elevation and section transverse to Fig. 7;

Fig. 9 is an enlarged view in vertical section of a portion of the control mechanism of Fig. 7;

Fig. 10 is a section taken substantially along line X—X of Fig. 9;

Figure 3:
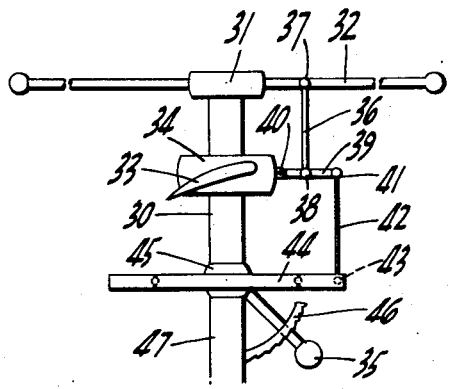
Fig. 3 is an illustration of the general features of one form of control mechanism of the invention.

Figs. 1 and 2 illustrate generally the type of helicopter aircraft with which the present invention is concerned, wherein the aircraft is shown as comprising generally a fuselage 10; landing gear elements 12—14; a tail boom 16; an engine 18; a rotor mast 20; a rotor 22; a fly bar 24; and a directional control propeller 25. It will be understood that the basic elements above designated will be arranged to function in accord with established principles of helicopter design and that, for example, the use of a propeller as at 25 to provide yaw control by countering the torque reaction effects from the rotor is optional, and that any other suitable directional control means may be employed in lieu thereof if preferred.

As illustrated in Fig. 3, a control arrangement of the invention may be provided to comprise a mast 30 carrying at its upper end a hinge connection at 31 supporting a fly bar 32 for rotation with the mast. The rotor is provided to comprise a pair of diametrically opposed blades 33 extending radially from a common hub 34 which is universally pivoted to the mast 30 so as to be freely rockable about the longitudinal axis of the rotor blade unit and inclinable about an axis perpendicular to the rotor blades. Thus, the rotor which is arranged to rotate with the mast (or a suitable drive shaft extending therewithin) is pivotable thereon for feathering control of the rotor blades and also for inclination of the plane of rotor rotation. Thus, thrust forces for motivation of the aircraft in horizontal directions may be effected as explained hereinabove.

To provide for control of the rotor the fly bar 32 is linked conjointly with the rotor and with a manually operable pilot control handle designated 35. To this end a link 36 is pivotally connected at 37 to the fly bar and at 38 to the mid section of a beam 39. The beam is pivotally connected at one end to the rotor hub 34, as at 40, and at its other end by means of a pivot connection 41 to a strut 42 which in turn pivotally connects at 43 with the outer race of a Saturn ring 44. The inner race of the Saturn ring is mounted by means of a ball and socket bearing 45 upon the mast 30 whereby the Saturn ring is universally rockable relative to the mast and freely rotatable relative thereto about the axis of the mast. Consequently, it will be understood that as the mast 30 rotates in response to driving action of the aircraft engine, the fly bar and rotor and control linkage mechanism will rotate therewith, while the control handle 35 may be supported to extend in any desired vertical plane into convenient reach of the aircraft pilot, as by means of a laterally supporting arm 46 extending from stationary supporting structure such as a mast supporting base 47 or the like.

If the mast 30 undergoes an inclination relative to the normal vertical attitude thereof, as in response to wind gusts against the fuselage, or the like, the fly bar 32 nevertheless tends to preserve its initial horizontal plane of rotation due to its inertia. Since the control ring 44 is rigidly connected to the control handle 35 and is thereby locked relative to the mast housing 47, the control ring 44 will thereupon be inclined, for example, in either direction away from the horizontal attitude thereof illustrated by Fig. 3. Such movement of the control ring 44 relative to the plane of rotation of the fly bar 32 will cause the rocker 39 to oscillate accordingly about the fulcrum 38 which is substantially vertically stationary due to resistance of the fly bar to be shifted out of its horizontal plane of rotation. Consequently, the rocker 39 will pivot the hub about the longitudinal axis of the rotor blades, thus feathering the rotor so as to cause it to track in a plane inclined with respect to the horizontal in the direction opposite to the direction of inclination of the mast away from vertical. Such feathering of the rotor develops a restoring force tending to pull the mast back into vertical position. Thus, stabilizing influences are automatically generated in response to every upsetting tendency from externally of the aircraft, and without attention to the control system by the pilot.

If, however, the pilot manipulates the control handle 35 so as to tilt the control ring 44 relative to the mast housing 47, the fly bar 32 tends to maintain the fulcrum 38 in vertically fixed position whereby the control linkage causes the rocker 39 to tilt the rotor about the longitudinal axis of the rotor blades in the opposite direction. This feathering of the rotor will in turn cause the mast to incline whereby the inclination of the rotor to the horizontal will be reduced, but a residuum of inclination or precessing of the rotor plane of rotation will be left, whereby a thrust force tending to drive the aircraft horizontally in the desired direction will be developed. Thus, the control arrangement of Fig. 3 will provide a very stable helicopter.

Figure 4:
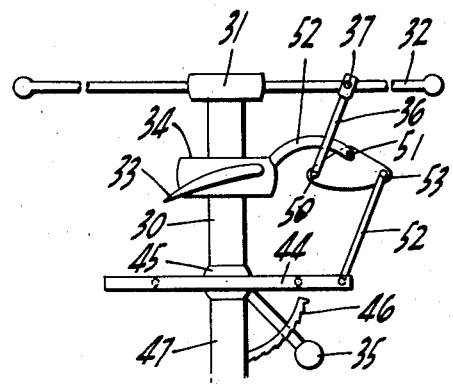
Figs. 4, 5 and 6 are views corresponding to Fig. 3 of other forms of the invention.

Fig. 4 illustrates a form of the invention which is intended to provide a quicker response to control manipulations than the form shown in Fig. 3. In general the rotor control mechanism is closely similar to that of Fig. 3 and differs therefrom only with respect to the control linkage arrangement wherein the link 36 pivotally connects at its lower end to one end of a rocker 50 which is supported intermediately of its ends by a pivot connection 51 carried by a horn 52 extending rigidly from the rotor hub. The pilot control link extending from the handle-controlled Saturn ring is indicated at 52 as being pivotally connected at its upper end to the opposite end of the rocker 50, as at 53. Thus, it will be appreciated that pilot-imposed control movements of the handle 35 will be translated into angular adjustments of reduced magnitude between the horizons of the fly bar and the rotor whereby any inclination of the mast will cause the rotor to incline to about one-half the extent of the mast inclination. This is sufficient to provide necessary stability and at the same time produces a very responsive control arrangement, because whenever the control ring is inclined by the pilot the rotor inclines in the same direction as does the control ring. Although the amount of rotor inclination is not so great as that of the control ring, the inclination of the mast due to the inclination of the rotor produces a further inclination of the rotor, thereby accelerating the response of the machine to the control.

Figure 5:
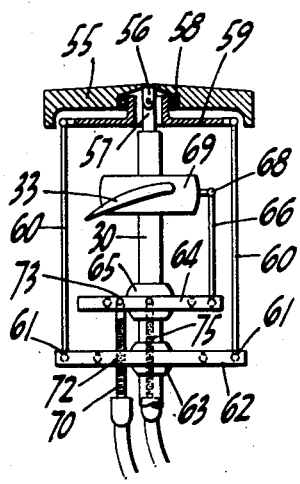

Another form of the control arrangement of the invention contemplates provision of a control mechanism whereby movements of the mast away from normal vertical attitude will produce no changes in the rotor position. Thus, complete independence between the rotor and the mast is provided. While there may be many ways in which a mechanism capable of this result may be provided, the arrangement of Fig. 5 is exemplary thereof and shows the helicopter mast 30 as being arranged to carry a flywheel 55 by means of a universal joint connection at 56. A high speed shaft 57 extending through the mast 30 is connected to the engine to drive the flywheel at rapid rate. A ball bearing 58 mounts a plate 59 upon the flywheel 55 so as to be inclined in response to every inclination of the flywheel without imparting of the rotation thereof. Struts 60—60 pivotally connect at diametrically opposed positions to the plate 59 to extend downwardly therefrom in spaced parallel relation to pivotally connect as at 61—61 at diametrically opposed position upon the outer race of a Saturn ring 62 which is carried by means of a universal joint connection 63 with its inner race upon the mast 30. A rotor control plate in the form of a second Saturn ring 64 mounted by means of a universal connection joint 65 to the mast 30 is pivotally connected at its outer race portion by means of a strut 66 extending into pivotal connection at 68 with a horn extending laterally from the rotor hub 69.

One end of a torque shaft 70 extending from a suitable pilot manipulatable control device (not shown) is screwthreaded through the inner race of the Saturn ring 62, as at 72, to extend therebeyond into pivotal connection at 73 with the inner race of the Saturn ring 64; whereby alternate extension-retraction movements of the screw shaft 70 will adjust the angular relation between the rings 62—64 in one plane of adjustment. Thus, pilot-imposed control effects will be translated to the rotor hub 69 through the strut 66, while forces tending to tilt the mast, such as wind forces from externally of the aircraft will not influence the control plate 73 whose position is controlled by the flywheel 55 through link system. A second pilot control screw 75 is threaded through the inner race of the Saturn ring 62 and then into pivotal connection with the inner race of the Saturn ring 64, as in the manner of the mounting of the control screw 70, except that the screws 70—75 are disposed at 90° spaced radial positions about the Saturn rings whereby the screw 75 may be manipulated to obtain the type of rotor control and stabilization referred to hereinabove in a plane transverse to the plane of control adjustments effected by the control screw 70. Consequently, selective manipulations of the control screws 70—75 will procure the desired composite control of the rotor throughout all phases of the rotor orbit. It should be noted that this control operation is accomplished independently of the inclination of the mast, and that should the mast incline, the control setting will not be changed.

Figure 6:
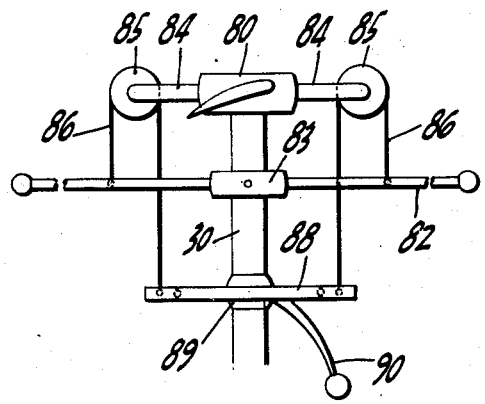
Figure 7:
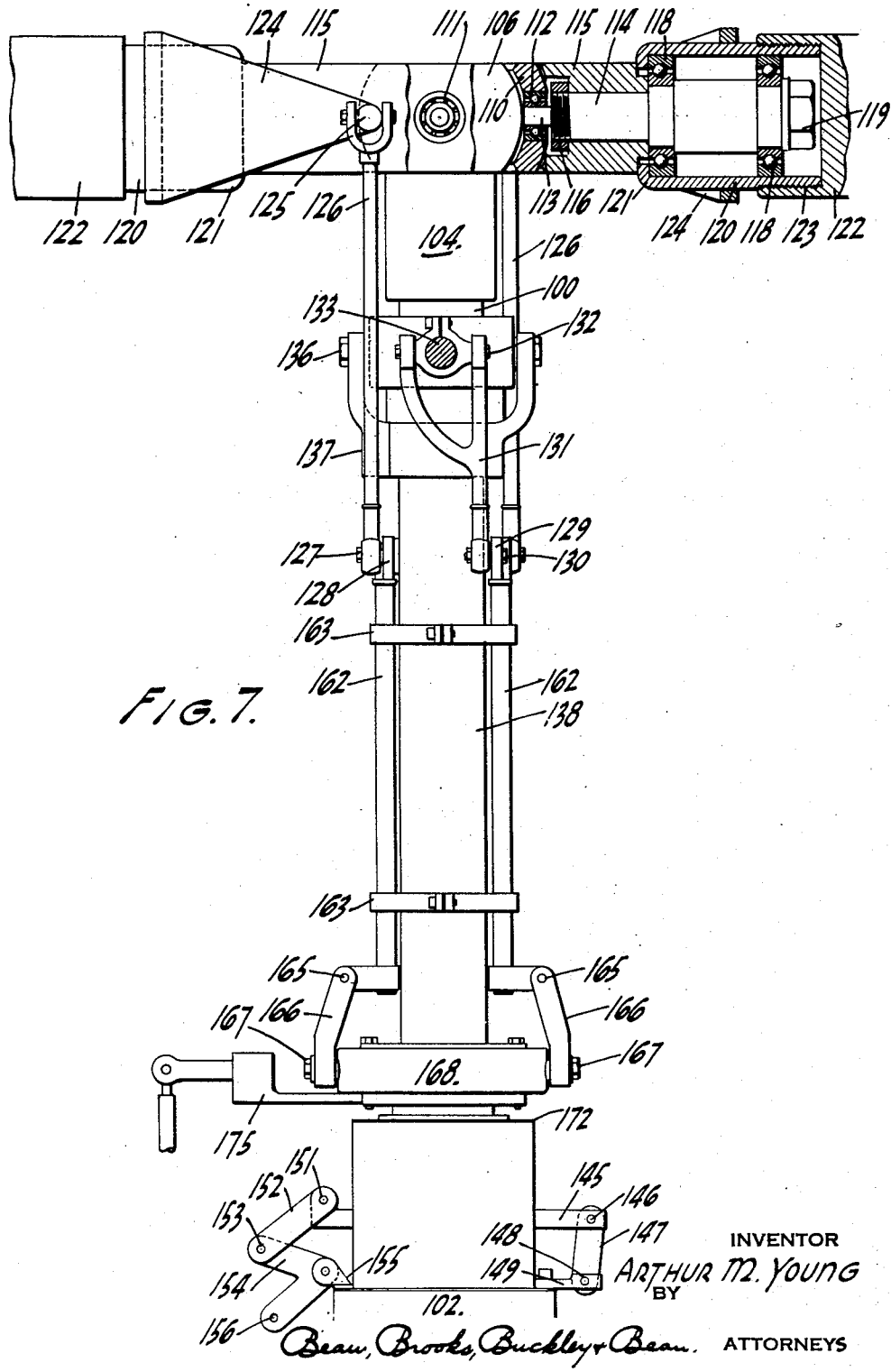
Fig. 7 is a fragmentary side elevation with portions in section of another form of rotor control mechanism of the invention.
Figure 11:
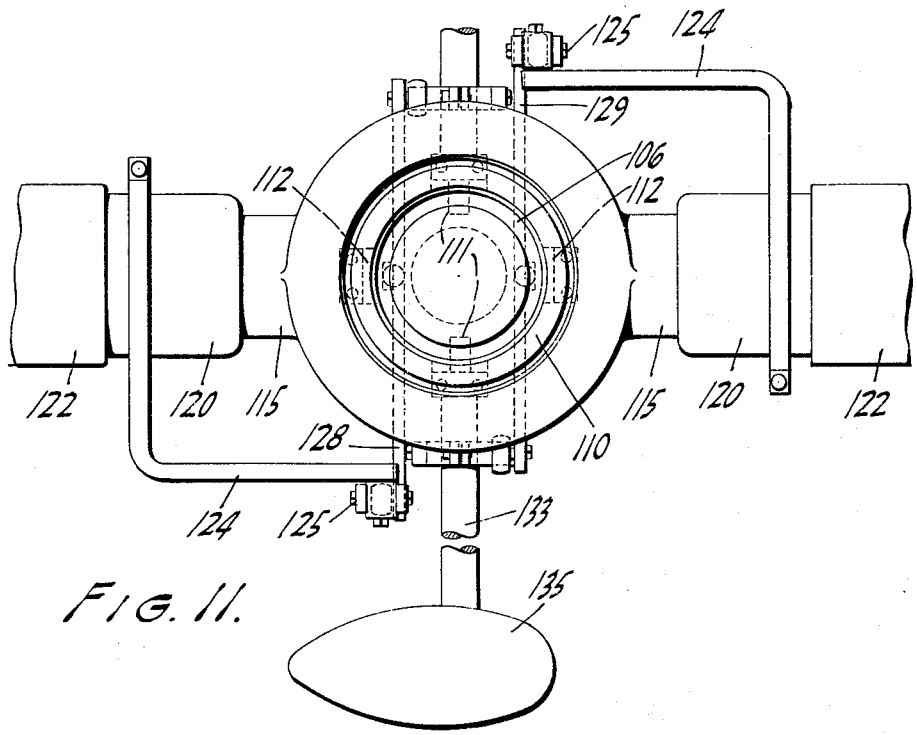
Fig. 11 is a fragmentary top plan of the mechanism of Figs. 7–10.
Figure 12:
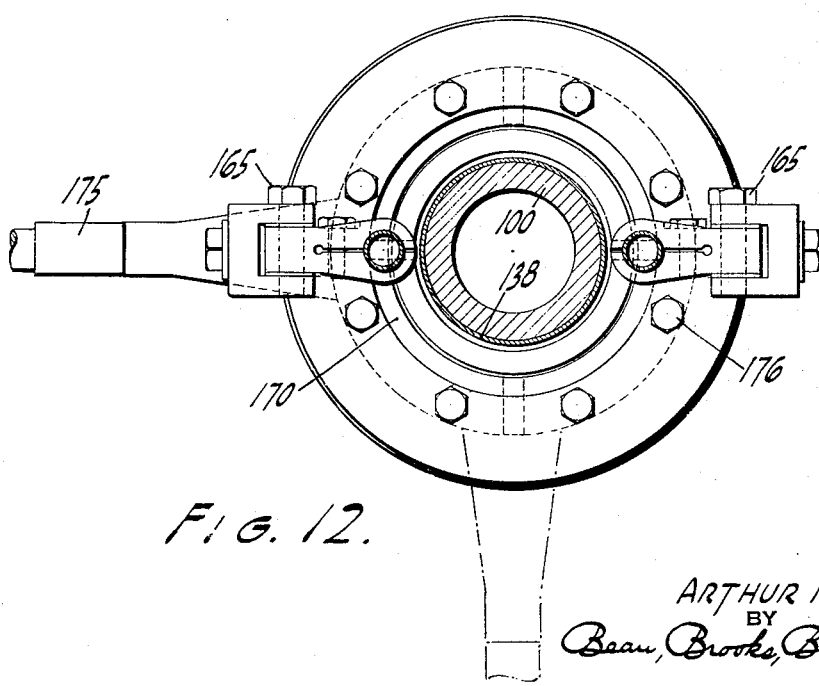
Fig. 12 is a section taken along line XII—XII of Fig. 9.

Fig. 6 illustrates a form of the control mechanism of the invention somewhat similar to the forms thereof shown by Figs. 3-4 and wherein the rotor hub 80 is universally pivoted to the top of the mast 30 for rotation about the longitudinal axis of the rotor blades. A fly bar 82 is mounted below the rotor to extend in a direction transversely thereof but also in a normally substantially horizontal plane of rotation. The fly bar is mounted upon the mast 30 by means of a pivot connection 83. A pair of horns 84—84 extend rigidly in diametrically opposed relation from the rotor hub 80 to carry at their outer ends corresponding pulleys 85—85 about which are threaded cables 86—86. One end of each cable is connected to the corresponding arm of the fly bar 82 and the other end of each cable is connected to the corresponding side portion of the outer race of a Saturn ring 88 which is universally mounted upon the mast 30 by means of a bearing 89. A pilot control handle 90 extends rigidly from the inner race of the Saturn ring 88 as in the manner of the previously described control handles; and thus it will be understood that while the rotor is susceptible to corrective impulses from the fly bar 82 this inherent stability feature is not interferred with by the means for transmitting controls to the rotor for pilot-maneuvering of the aircraft. Thus, it will be understood that the invention provides an inherently stable and yet readily controllable helicopter, and that the pilot control device may be locked to provide continuous flight maneuvers and that the features of the invention may be obtained through use of apparatus incorporating either a flywheel or a simple hinged fly bar.

Figs. 7-12 illustrate in greater detail the structure of a helicopter control arrangement of the invention which combines the stabilizing horizon control features hereinabove referred to with a rotor blade pitch control arrangement, whereby a new and improved combination control mechanism is provided. In the drawings the mast is illustrated at 100 (Fig. 10) as being mounted to extend vertically from the upper end of the helicopter engine or gear case designated 102 and connected to the engine output shaft for driving the rotor and fly bar units. At its upper end, the mast 100 is provided with an integral head 104 which mounts a spherically surfaced knob 106. The knob 106 carries a ring 110 which is pivoted to the knob by a pair of aligned bearings 111—111 for free pivotal movement relative to the knob. At transversely opposed positions the ring 110 carries a pair of bearings 112—112 which rotatably engage stub portions 113—113 of corresponding shafts 114—114 which extend radially through corresponding portions of a ring-like hub 115. Lock nuts 116 are shown to assemble the shafts 114—114 upon the hub.

Adjacent their outer ends, the shafts 114—114 carry longitudinally spaced bearings 118—118; and assembly of the bearing-shaft-hub assembly is completed by lock nuts 119—119. The outer races of the bearings 118—118 mount collars 120 which are turned in at 121 to flange against the corresponding inner bearing member 118 to withstand centrifugal forces developed by the rotor rotation. The rotor blade roots are designated 122 as being counterbored and threaded for connection at 123 with the corresponding collar 120, whereby upon final assembly of the rotor unit the blades are integral with the collars 120—120 and are supported by the bearings 118 to be rotatable for pitch change purposes on the shafts 114 about a common axis extending through the hub center. A horn 124 extends rigidly from each of the collars 120 toward the mast 100 and eccentrically of the axis of pitch change rotation of the blades. A swivel connection device 125 at the end of each horn 124 connects the latter to the upper end of a corresponding push rod 126.

The push rods 126—126 (Figs. 7 and 8) extend vertically downwardly into corresponding pivotal connections at 127—127 with corresponding rockers at opposite ends thereof. For clarity of description the rocker connected to one of the arms 126 is designated 128 and the rocker connected to the other rod 126 is designated 129. The rockers 128—129 each connect at their opposite ends to the connections 127—127 by means of pivotal connections 130—130 to the lower ends of corresponding push pull rods 131—131 which extend vertically into pivotal connections at 132—132 with opposite arms of a fly bar 133 which has a central root in the hub portion 134. Streamlined weights 135—135 are carried at the outer ends of the arms of the fly bar, and the fly bar hub is pivotally mounted by means of a trunnion bearing 136 carried by a fork 137 which clamps upon the upper end of a sleeve 138 mounted telescopically about the mast 100.

At its lower end the sleeve 138 rigidly carries the inner race of a bearing assembly 140 (Fig. 9) as by means of bolt connections at 141. The outer race of the bearing assembly 140 carries integrally therewith a spherical surfaced body 142 which engages a correspondingly socketed portion 144 of a control bar 145. The bar 145 is pivoted at 146 to one end of a link 147, the other end of which pivots at 148 to a bracket 149 fixed to the engine case, as by means of bolts 150. The other end of the control arm 145 carries by means of pivotal connection 151 a link 152 which in turn pivotally connects at 153 to one arm of a bell crank 154. The crank 154 is pivoted to a fixed bracket 155, and the other arm of the crank is formed as at 156 for connection to any suitable type of manual control device arranged to extend into convenient reach of the pilot for applying pilot control movements thereto.

Thus, it will be understood that oscillation of the bell crank 154 by the pilot will shift the sleeve 138 vertically relative to the mast 100, whereby the fly bar will be lowered or elevated bodily without alteration of the plane of rotation thereof. Substantially intermediately of its ends the rocker 129 pivotally connects as at 160 with a corresponding push-pull member 162 which extend vertically downwardly therefrom and parallel to the rotor mast. The rocker 128 is similarly pivoted intermediately of its ends in line with the pivot axis of the connection 160 upon the top end of a second push pull member 162 (Fig. 7) which extends downwardly therefrom and parallel to the first mentioned member 162 and the rotor mast. To guide the push-pull members they are arranged to slidably thread through bearing blocks 163—163 carried by the sleeve 138. At their lower ends, the push-pull members 162—162 pivotally engage at 165—165 with corresponding links 166—166 which extend downwardly therefrom into swivel connections at 167—167 with diametrically opposed portions of the outer race 168 of a Saturn ring device (Fig. 9). The inner race 169 of the Saturn ring device is universally mounted upon a spherically shaped hub 170 which extends vertically from a stationary housing 172 which envelopes the lower end of the mast-sleeve unit and which is based upon and rigidly fixed to the engine case 102. A pair of pilot operable control bars 175—175 are bolted to the inner race 169 of the Saturn ring device, as by means of bolts 176, to extend radially therefrom and in spaced relation so as to enable the pilot to tilt the ring 168—169 in any direction. Any push-pull control means or the like may be connected to the handles 175—175 as indicated in Fig. 8 to convey pilot control forces thereto.

Thus, it will be understood that oscillation of the bell crank 154 by the pilot will shift the sleeve 138 vertically relative to the mast 100. This will move the fly bar bodily without altering the plane of rotation thereof either upwardly or downwardly relative to the mast, and the links 131—131 will thereupon cause the corresponding rockers 128—129 to oscillate in opposite directions as viewed in Fig. 8 about the fulcrum connection devices 160—160 which are fixed against simultaneous vertical movements in similar direction by reason of their connections through the links 162—166 with the Saturn ring device 168. Thus, manipulation of the pilot control crank 154 will change the pitch of the rotor blades simultaneously and to equal degrees to procure adjustments of the lift characteristics of the rotor in accord with maneuvering requirements and without interference with operation of the rotor "feathering" control and the functions of the automatic stabilizing means.

Similarly, it will be understood that manipulation of the pilot control members 175—175 in such manner as to tilt the Saturn ring device 168—169 upon the swivel bearing 170 will provide opposite push-pull effects to be transmitted through the links 162—162 into the rockers 128—129 in step with the rotor rotation. Inasmuch as the fly bar 133 tends to resist movements away from any given position thereof, the rockers 128—129 now fulcrum about the pivot connections 127—127 and transmit to the corresponding push rods 126—126 motions tending to rotate the rotor blades simultaneously and in the same direction about the axes of the hub shafts 114—114. Consequently, the angle of attack of the rotor blade advancing relative to the airstream externally of the aircraft may be either increased or decreased while the angle of attack of the retreating rotor blade is simultaneously decreased or increased, as the case may be. This results in inclination of the plane of rotor rotation in such manner as to produce a thrust component in some horizontal direction, as determined by the nature of the pilot control motion, whereby maneuvering control of the aircraft may be effected as explained hereinabove. Upon completion of any controlled maneuver, the pilot may simply lock the control device 175 relative to fixed structure of the aircraft, and the machine will thereupon continue to fly on the established course and at uniform speed.

Thus, the control arrangements of the invention are such that the pilot may cause the aircraft to lift or rise from the ground either vertically or in any inclined path by setting the control ring attached to the handles 175—175 either to be level or inclined downwardly in the direction of the desired horizon flight component. The rate of climb is regulated by manipulation of the bell crank 154 along with throttle regulations of the engine speed. For hovering maneuvers the control handles 175—175 are simply adjusted to their "level" positions, and the vertical rise or fall of the aircraft is regulated by the pitch change adjustment mechanism through the bell crank 154. Thus, the control system of the invention gives the pilot absolute control of the rotor with respect to the horizon while the rotor mast is at all times free to swing and incline with respect to the plane of rotor rotation without affecting the plane of the rotor rotation to provide the ready control and inherent stability features of the invention.

It will be understood that although only a limited number of specific forms of the control mechanism of the invention have been illustrated and described in detail, various changes may be made therein without departing from the spirit of the invention or the scope of the appended claims.

I claim:

1. In an aircraft, in combination, a rotor comprising a central hub and rotor blades extending radially therefrom, rotating inertia means carried by said aircraft, means mounting said rotor hub on said aircraft to permit universal inclination with respect thereto, means mounting said inertia means on said aircraft to permit universal inclination with respect thereto, means linking said rotor hub and said inertia means to control the relative inclination of the planes of rotation thereof, and pilot control means connected to said link means for actuating the latter to adjust the relative inclination of the planes of rotation of said rotor and said inertia means.

2. In an aircraft, in combination, a rotor comprising a central hub and rotor blades extending radially therefrom, rotating inertia means carried by said aircraft, means mounting said rotor hub on said aircraft to permit universal inclination with respect thereto, means mounting said inertia means on said aircraft to permit universal inclination with respect thereto, means linking said rotor hub and said inertia means to control the relative inclination of the planes of rotation thereof, and pilot control means connected to said link means for actuating the latter to react only against said rotor hub and said inertia means to adjust the relative inclination of the planes of rotation of said rotor and said inertia means.

3. In an aircraft, in combination, a rotor comprising a central hub and rotor blades extending radially therefrom, rotating inertia means carried by said aircraft, the mean plane of rotation of said inertia means being substantially parallel to the mean plane of rotation of said rotor in normal flight, means mounting said rotor hub on said aircraft to permit universal inclination with respect thereto, means mounting said inertia means on said aircraft to permit universal inclination with respect thereto, means linking said rotor hub and said inertia means to control the relative inclination of the planes of rotation thereof, and pilot control means connected to said link means for actuating the latter to adjust the relative inclination of the planes of rotation of said rotor and said inertia means.

4. In an aircraft, in combination, a rotor comprising a central hub and rotor blades extending radially therefrom, rotating inertia means carried by said aircraft, the mean plane of rotation of said inertia means being substantially parallel to the mean plane of rotation of said rotor in normal flight, means mounting said rotor hub on said aircraft to permit universal inclination with respect thereto, means mounting said inertia means on said aircraft to permit universal inclination with respect thereto, means linking said rotor hub and said inertia means to control the relative inclination of the planes of rotation thereof, and pilot control means connected to said link means for actuating the latter to react only between said rotor hub and said inertia means to adjust the relative inclination of the planes of rotation of said rotor and said inertia means.

5. In an aircraft, in combination, a rotor comprising a central hub and a pair of diametrically opposed rotor blades extending radially therefrom, rotating inertia means carried by said aircraft, the mean plane of rotation of said inertia means being substantially parallel to the mean plane of rotation of said rotor in normal flight, means mounting said rotor hub on said aircraft to permit universal inclination with respect thereto, means mounting said inertia means on said aircraft to permit universal inclination with respect thereto, means linking said rotor hub and said inertia means to control the relative inclination of the planes of rotation thereof, and pilot control means connected to said link means for actuating the latter to react only against said rotor hub and said inertia means to adjust the relative inclination of the planes of rotation of said rotor and said inertia means.

6. In a helicopter aircraft, in combination, a rotor supporting mast, a rotor comprising a central hub and blades extending radially therefrom, means mounting said rotor upon said mast for rocking of the plane of rotor rotation relative to said mast, rotating inertia means mounted upon said mast to rotate in a plane substantially parallel to the mean plane of rotation of said rotor in normal flight and to be rockable therewith relative to said mast, link means interconnecting said inertia means and said rotor and comprising a lever pivoted at one end to said rotor hub and intermediately of its ends to link means extending into pivotal engagement with said inertia means so as to extend eccentrically of the axes of rocking of said inertia means and of said rotor, and pilot control means coupled to the opposite end of said lever for actuation thereof to vary the effective length of the link means interconnecting said inertia means and said rotor for varying the relative inclination of the planes of rotation thereof.

7. In a helicopter aircraft, in combination, a rotor supporting mast, a rotor comprising a central hub and a pair of diametrically opposed blades extending radially therefrom, means mounting said rotor upon said mast for rocking movement of said rotor about the longitudinal axis thereof, rotating inertia means mounted upon said mast to rotate in a plane substantially parallel to the mean plane of rotation of said rotor in normal flight and to be rockable in either direction of rocking of said rotor about said longitudinal axis, link means interconnecting said inertia means and said rotor and comprising a lever pivoted at one end to said rotor hub and intermediately of its ends to link means extending into pivotal engagement with said inertia means so as to extend eccentrically of the axes of rocking of said inertia means and of said rotor, and pilot control means coupled to the opposite end of said lever for actuation thereof to vary the effective length of the link means interconnecting said inertia means and said rotor for varying the relative inclination of the planes of rotation thereof.

8. In a helicopter aircraft, in combination, a rotor supporting mast, a rotor comprising a central hub and a pair of diametrically opposed blades extending radially therefrom, means mounting said rotor upon said mast for rocking movement of said rotor about the longitudinal axis thereof, rotating inertia means mounted upon said mast to rotate in a plane substantially parallel to the mean plane of rotation of said rotor in normal flight and to be rockable in either direction of rocking of said rotor about said longitudinal axis, link means interconnecting said inertia means and said rotor and comprising a lever pivoted at one end to said rotor hub and intermediately of its ends to link means extending into pivotal engagement with said inertia means so as to extend eccentrically of the axes of rocking of said inertia means and of said rotor, and pilot control means coupled to the opposite end of said lever for actuation thereof to vary the effective length of the link means interconnecting said inertia means and said rotor for varying the relative inclination of the planes of rotation thereof, said pilot control means comprising a Saturn ring device rockably mounted upon said mast, a pilot control handle extending rigidly from the inner race portion of said Saturn ring device and a link pivotally connected to the outer race portion thereof and extending into pivotal connection with the outer end of said lever.

9. In a helicopter aircraft, in combination, a rotor supporting mast, a rotor comprising a hub and blades extending radially therefrom, means mounting said rotor hub upon said mast for relative rocking movement thereof, rotating inertia means mounted upon said mast to rotate in a plane substantially parallel to the mean plane of rotation of said rotor in normal flight and to be rockable relative to said mast, a lever fulcrumed intermediately of its ends to said rotor hub at a position eccentrically of the axis of rocking thereof, link means extending into pivotal engagement with said inertia means at a position eccentrically of the axis of rocking thereof and with one end of said lever, and pilot control means coupled to the oppostie end of said lever for actuation thereof to vary the effective length of the interconnection between said inertia means and said rotor for varying the relative inclination of the planes of rotation thereof.

10. In a helicopter aircraft, in combination, a rotor supporting mast, a rotor comprising a hub and a pair of diametrically opposed blades extending radially therefrom, means mounting said rotor hub upon said mast for rocking movement of said rotor about the longitudinal axis thereof, rotating inertia means mounted upon said mast to rotate in a plane substantially parallel to the mean plane of rotation of said rotor in normal flight and to be rockable in either direction of rocking of said rotor about said longitudinal axis, a lever fulcrumed intermediately of its ends to said rotor hub at a position eccentrically of the axis of rocking thereof, link means extending into pivotal engagement with said inertia means at a position eccentrically of the axis of rocking thereof and with one end of said lever, and pilot control means coupled to the opposite end of said lever for actuation thereof to vary the effective length of the interconnection between said inertia means and said rotor for varying the relative inclination of the planes of rotation thereof.

11. In a helicopter aircraft, in combination, a rotor supporting mast, a rotor comprising a hub and a pair of diametrically opposed blades extending radially therefrom, means mounting said rotor hub upon said mast for rocking movement of said rotor about the longitudinal axis thereof, rotating inertia means mounted upon said mast to rotate in a plane substantially parallel to the mean plane of rotation of said rotor in normal flight and to be rockable in either direction of rocking of said rotor about said longitudinal axis, a lever fulcrumed intermediately of its ends to said rotor hub at a position eccentrically of the axis of rocking thereof, link means extending into pivotal engagement with said inertia means at a position eccentrically of the axis of rocking thereof and with one end of said lever, and pilot control means coupled to the opposite end of said lever for actuation thereof to vary the effective length of the interconnection between said inertia means and said rotor for varying the relative inclination of the planes of rotation thereof, said pilot control means comprising a Saturn ring device rockably mounted upon said mast, a pilot control handle extending rigidly from the inner race portion of said Saturn ring device and a link pivotally connected to the outer race portion thereof and extending into pivotal connection with the outer end of said lever.

12. In a helicopter aircraft, in combination, a rotor supporting mast, a rotor comprising a hub and blades extending radially therefrom, means mounting said rotor upon said mast for relative rocking movement thereof, rotating inertia means mounted upon said mast to rotate in a plane substantially parallel to the mean plane of rotation of said rotor in normal flight and to be universally rockable relative to said mast, link means pivoted at one end to said rotor eccentrically of the axis of rocking thereof and at its other end to a control member mounted for universal movement upon said mast, second link means extending into pivotal engagement with said inertia means so as to extend therefrom in a direction eccentrically of the axis of rocking of said inertia means into pivotal connection with a second control member mounted for universal tilting movement upon said mast, and pilot control means interconnecting said first and said second control members for actuation thereof to vary the relative inclination thereof.

13. In a helicopter aircraft, in combination, a rotor supporting mast, a rotor comprising a hub and a pair of diametrically opposed blades extending radially therefrom, means mounting said rotor upon said mast for rocking movement of said rotor about the longitudinal axis thereof, rotating inertia means mounted upon said mast to rotate in a plane substantially parallel to the mean plane of rottion of said rotor in normal flight and to be universally rockable relative to said mast, a pair of control plates of the Saturn ring type mounted upon said mast to be universally tiltable thereto, link means pivoted at one end to said rotor eccentrically of the axis of rocking thereof and at ts other end to the outer race of one of said control plates, second link means extending into pivotal engagement with said inertia means so as to extend therefrom in a direction eccentrically of the axis of rocking of said inertia means into pivotal connection with the outer race of the other of said control plates, and pilot control means interconnecting the inner race portions of control plates for actuation thereof to vary the relative inclination thereof.

14. In a helicopter aircraft, in combination, a rotor supporting mast, a rotor comprising a hub and blades extending radially therefrom, means mounting said rotor upon said mast for relative rocking movement thereof, rotating inertia means mounted up said mast to rotate in a plane substantially parallel to the mean plane of rotation of said rotor in normal flight and to be rockable relative to said mast, a control member mounted upon said mast and tiltable thereon by control forces applied manually thereto, pulley means carried by said rotor hub eccentrically of the axis of rocking thereof, cable means tied to said inertia means and to said control member and trained around said pulley means for translating effects of pilot-tilting of said control member into adjustments of the relative inclination of the planes of rotation of said rotor and said inertia means.

15. In a helicopter aircraft, in combination, a rotor supporting mast, a rotor comprising a hub and a pair of diametrically opposed blades extending radially therefrom, means mounting said rotor upon said mast for rocking movement of said rotor about the longitudinal axis thereof, rotating inertia means mounted upon said mast to rotate in a plane substantially parallel to the mean plane of rotation of said rotor in normal flight and to be rockable in either direction of rocking of said rotor about said longitudinal axis, a control plate of the Saturn ring type carried by its inner race portion upon said mast and tiltable thereon by manually applied control forces, a pair of pulleys carried by said rotor hub at opposite sides thereof eccentrically of the axis of rocking thereof, a cable tied to said inertia means and to said control plate and trained in reverse-direction manner around each of said pulleys for translating effects of pilot-tilting of said control plate into adjustments of the relative inclination of the planes of rotation of said rotor and said inertia means.

16. In an aircraft, in combination, a rotor comprising a central hub and rotor blades extending radially therefrom, means mounting said blades with respect to said hub to permit relative rotation therebetween for change of blade angle of attack purposes, rotating inertia means carried by said aircraft, means mounting said rotor hub on said aircraft to permit universal inclination with respect thereto, means mounting said inertia means on said aircraft to permit universal inclination with respect thereto and movement of the plane of rotation of said inertia means without inclination thereof, means linking said rotor hub and said inertia means to control the relative inclination of the planes of rotation thereof, pilot control means connected to said link means for actuating the latter to react only against said inertia means and against said rotor to adjust the relative inclination of the planes of rotation of said rotor and said inertia means, pilot control means connected to said inertia means for bodily shifting the latter without inclination thereof, and means interconnecting said inertia means and said rotor blade mounting means responsive to bodily shifting of said inertia means to adjust said rotor blades simultaneously to different angles of attack.

17. In an aircraft, in combination, a rotor comprising a central hub and rotor blades extending radially therefrom, means mounting said blades with respect to said hub to permit relative rotation therebetween for change of blade angle of attack purposes, rotating inertia means carried by said aircraft, the mean plane of rotation of said inertia means being substantially parallel to the mean plane of rotation of said rotor in normal flight, means mounting said rotor hub on said aircraft to permit universal inclination with respect thereto, means mounting said inertia means on said aircraft to permit universal inclination with respect thereto and movement of the plane of rotation of said inertia means toward and away from the plane of rotation of said rotor, means linking said rotor hub and said inertia means to control the relative inclination of the planes of rotation thereof, pilot control means connected to said link means for actuating the latter to adjust the relative inclination of the planes of rotation of said rotor and said inertia means, pilot control means connected to said inertia means for shifting the latter toward or away from the plane of rotation of said rotor, and means interconnecting said inertia means and said rotor blades mounting means responsive to shifting of said inertia means to adjust said rotor blade simultaneously to different angles of attack.

18. In an aircraft, in combination, a rotor comprising a central hub and a pair of diametrically opposed rotor blades extending radially therefrom, means mounting said blades with respect to said hub to permit relative rotation therebetween for change of blade angle of attack purposes, rotating inertia means carried by said aircraft, the mean plane of rotation of said inertia means being substantially parallel to the mean plane of rotation of said rotor in normal flight, means mounting said rotor hub on said aircraft to permit universal inclination with respect thereto, means mounting said inertia means on said aircraft to permit universal inclination with respect thereto and bodily movement of the plane of rotation of said inertia means toward and away from the plane of rotation of said rotor, link means interconnecting said rotor blades and said inertia means whereby the attitude of the plane of rotation of said inertia means relative to the plane of rotation of said rotor controls the angles of attack of said rotor blades in reversely adjusted manner for feathering of said rotor blades, pilot control means connected to said link means for actuating the latter to adjust the relative inclination of the planes of rotation of said rotor and of said inertia means, pilot control means connected to said inertia means for bodily shifting the latter toward or away from the plane of rotation of said rotor, and means interconnecting said inertia means and said rotor blades responsive to such bodily shifting of said inertia means to similarly adjust said rotor blades simultaneously to different angles of attack.

19. In an aircraft, a body, a rotary member mounted on said body for rotation about a generally upright axis, blade means, means mounting said blade means on said rotary member for change of the effective incidence of said blade means, inertia means rotatable about an axis generally parallel to said upright axis, means mounting said inertia means on said body for universal inclination relative thereto, means connecting said inertia means with said blade means to control the effective incidence of said blade means, and a pilot operable control means interconnecting said blade means and said inertia means and adjustable to vary the relative inclination of the planes of rotation of said rotor and said inertia means.

20. In an aircraft, a body, a rotary member mounted on said body for rotation about a generally upright axis, blade means, means mounting said blade means on said rotary member for change of the effective incidence of said blade means, inertia means rotatable about an axis generally parallel to said upright axis, means mounting said inertia means on said body for universal inclination relative thereto, means connecting said inertia means with said blade means to control the effective incidence of said blade means, a lever, a pilot-operable member, means interconnecting said lever at one of its ends with said inertia means and at its other end with said pilot-operable member and intermediately of its ends with said blade means.

21. In an aircraft, a body, a rotary member mounted on said body for rotation about a generally upright axis, blade means, means mounting said blade means on said rotary member for change of the effective incidence of said blade means, inertia means rotatable about an axis generally parallel to said upright axis, means mounting said inertia means on said body for universal inclination relative thereto, means connecting said inertia means with said blade means to control the effective incidence of said blade means, a lever, a pilot-operable member, means interconnecting said lever at one of its ends with said blade means and at the other of its ends with said control means and intermediately of its ends with said inertia means.

22. In an aircraft, a body, a rotary member mounted on said body for rotation about a generally upright axis, blade means, means mounting said blade means on said rotary member for change of the effective incidence of said blade means, inertia means rotatable about an axis generally parallel to said upright axis, means mounting said inertia means on said body for universal inclination relative thereto, a control device pivotally mounted upon said rotary member and connected to said inertia means to incline in synchronism therewith, a pilot-operable member, a second control device pivotally mounted upon said rotary member and interconnected with said first control device by said pilot-operable member, and means interconnecting said second control member with said blade means for controlling the effective incidence thereof.

23. In an aircraft, a body, a rotary member mounted on said body for rotation about a generally upright axis, blade means, means mounting said blade means on said rotary member for change of the effective incidence of said blade means, inertia means rotatable about an axis generally parallel to said upright axis, means mounting said inertia means on said body for universal inclination relative thereto, means connecting said inertia means with said blade means to control the effective incidence of said blade means, a pilot-operable member, and control means connecting at one of its ends to said inertia means and at its other end with said pilot-operable member and intermediately of its ends with said blade means.

ARTHUR M. YOUNG.